Nov. 11, 1969          I. B. COOPER, JR          3,478,330
DATA STORAGE CIRCUIT UTILIZING A CONTROLLED RECTIFIER
Filed June 21, 1966
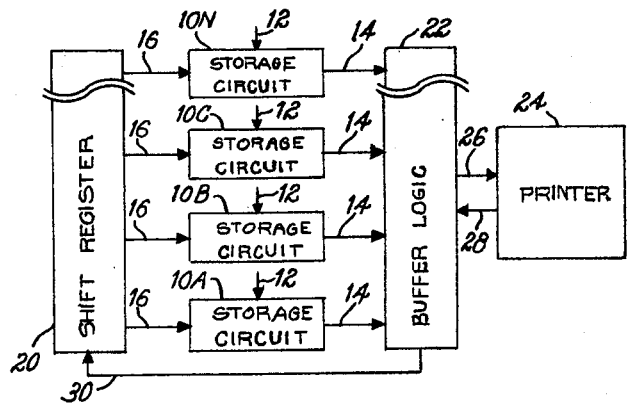
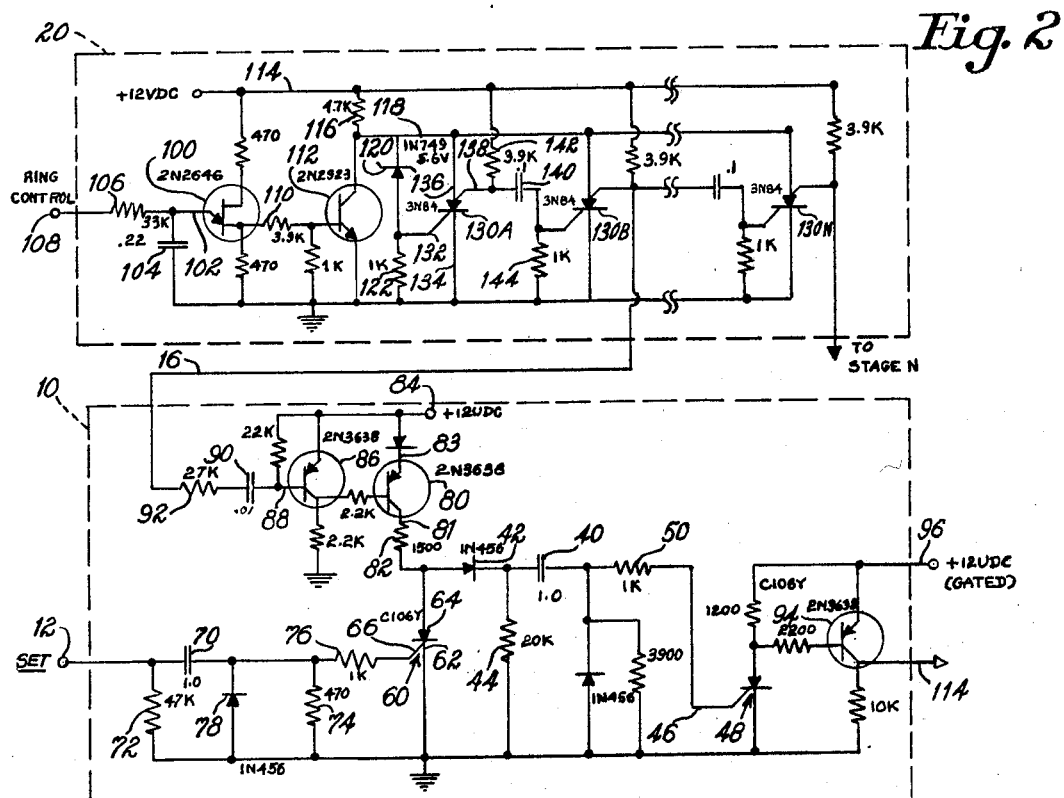

United States Patent Office 3,478,330
Patented Nov. 11, 1969

3,478,330
DATA STORAGE CIRCUIT UTILIZING
A CONTROLLED RECTIFIER
Irving B. Cooper, Jr., Marblehead, Mass., assignor to
Industrial Instrumentations, Inc., Marblehead, Mass.,
a corporation of Massachusetts
Filed June 21, 1966, Ser. No. 559,330
Int. Cl. G11b 31/00; H03k 17/00
U.S. Cl. 340—173
10 Claims

ABSTRACT OF THE DISCLOSURE

A data storage circuit includes a controlled rectifier that has a main circuit and a control electrode. Input circuitry coupled to the control electrode includes a pulse shaping network having a coupling capacitor connected in series with the control electrode for generating a pulse of predetermined effective time duration. A sampling circuit coupled to the main circuit applies a sampling signal of substantially shorter time duration than the data storage signal for releasing the main circuit from conducting condition in a data readout operation. An output circuit includes a capacitor, a charging circuit including a diode connected between the main circuit and the capacitor, and a discharging circuit which controls the rate of discharge of the capacitor. The output circuit produces a voltage transition if the main circuit of the controlled rectifier remains released from conducting condition after termination of the sampling signal.

---

This invention relates to electrical circuitry and more particularly to information storage circuitry of the type particularly adapted for inclusion in control systems and to control systems that incorporate such storage elements.

An object of this invention is to provide a novel and improved information storage circuit in a simplified arrangement that is reliable in operation. A particular object of the invention is to provide an improved and inexpensive information storage circuit that provides positive control with respect to coordination of input and readout operations. A further object of the invention is to provide an information storage circuit that is adapted for reliable incorporation into relatively complex data handling systems. A more specific object of the invention is to provide an improved parallel to series convertor.

The invention provides a simple, reliable data storage circuit utilizing a controlled rectifier as the significant data storage control element. A data storage condition is represented by the rectifier in conducting condition and readout is accomplished by releasing the rectifier from conducting condition. A particular feature of the circuit is the protection it affords against ambiguous data readout signal, as readout results only if the rectifier is released and remains released in response to a sampling signal.

The information storage circuit in a particular embodiment of the invention includes a capacitive element that has an input terminal and an output terminal. The capacitor's output terminal is connected to suitable output equipment and a controlled rectifier is connected to the input terminal through a diode in a charging control circuit. Also connected to the input terminal is a discharging circuit that includes an electric circuit component that cooperates with the capacitive element and controls the rate of discharge of that element. The controlled rectifier has a control electrode and an output electrode. A source of potential is connected to the junction between the charging circuit and the output electrodes of the controlled rectifier. Circuitry connected to the control electrode of the controlled rectifier generates a switching signal of relatively long-time duration in response to a data input signal which is effective to switch the controlled rectifier into conductive state in which it remains after termination of the switching signal. The controlled rectifier in conductive state, removes the effect of the potential source on the charging circuit to permit the capacitive storage element to commence to discharge through the discharging circuit. A gating circuit controls the application of the source of potential to the charging circuit junction and is operative, in response to a sampling signal, to remove that source of potential from the junction (and from the output electrode of the controlled rectifier) for an interval of time substantially shorter than the duration of the input signal but of sufficient time to release the controlled rectifier. If the charge on the capacitive element is below a predetermined value when the potential source is reconnected to the charging circuit, an output voltage transition is produced which is in excess of the operating threshhold of the output equipment connected to the output terminal of the capacitive storage element and that equipment is actuated and the controlled rectifier is in non-conductive condition ready for the next data input signal. Should a switching signal still be applied to the control electrode of the rectifier, however, no output transition is produced as the rectifier immediately conducts again on closing of the gating circuit.

This storage circuit is inexpensive to construct and reliable in operation. A particular advantage of the circuit is the elimination of pulse splitting conditions as synchronization between input and sampling signals is not required. Each input signal is readout and duplicate readout of an input signal is prevented. In a preferred embodiment in the form of a parallel to series converter, a series of storage circuits are sampled serially under the control of a shift register that generates the preferred form of sampling pulse. This shift register employs controlled switching devices of the silicon type in a simple and reliable circuit arrangement peculiarly adapted for use with the storage circuits. The invention is also useful for controlling the application of random inputs as from card readers of a security system to a common output device such as a printer. Other uses of the invention will be apparent to those skilled in the art.

Other objects, features and advantages of the invention will be seen as the following description of a particular embodiment thereof progresses, in conjunction with the drawings, in which:

FIG. 1 is a block diagram of data translation equipment constructed in accordance with the invention;

FIG. 2 is a schematic diagram of the shift register and one of the storage circuits employed in the equipment shown in FIG. 1; and FIGS. 3A and B are two diagrams indicating relationships of sampling and input wave forms employed in the circuitry shown in FIG. 2.

With reference to FIG. 1, there is shown a data translation system employing a series of storage circuits 10 each having an input 12, an output 14, and a sample or sense input 16. The sense inputs are connected to a shift register 20 which applies sampling signals to the lines 16 in sequence. The output lines 14 connected to suitable buffer logic 22 which modifies the output signal and applies it to appropriate output circuitry such as printer 24 over lines 26. The printer upon completion of an operation in response to signals over lines 26 applies a return signal over line 28 through the buffer logic to remove a hold level applied on line 30 to the shift register. Upon the removal of that hold level the shift register 20 resumes sampling of the storage circuits 10. Further details of the system will be seen with reference to FIG. 2.

Each storage circuit 10 includes a capacitive storage element 40. A charging circuit including diode 42 and a discharging circuit including resistor 44 are connected to one capacitor terminal. Coupled to the other terminal capacitor 40 is an output circuit which applies a signal to the control electrode 46 of controlled rectifier 48 through resistor 50.

The storage element charging and discharging circuits are controlled by a second controlled rectifier 60 having a cathode 62 connected to ground, an anode 64 connected to diode 42, and a control electrode 66 connected to input line 12 through an integrating circuit which includes capacitor 70, resistors 72, 74 and 76, and diode 78. It will be noted that the input circuit to controlled rectifier 48 is similar to the input circuit of controlled rectifier 60, the component values being selected to provide the desired timing relationships.

Also connected to the anode of controlled rectifier 60 is a switching transistor 80, the collector of 81 of which is connected through resistor 82 to anode 64 and the emitter 83 of which is connected to a 12 v. DC potential source at terminal 84. This switching transistor 80 is in normally conducting condition and is controlled by control transistor 86, the base 88 of which is connected via capacitor 90 and resistor 92 to line 16 from the shift register 20.

The output circuit of capacitor 40 connected to controlled rectifier 48 which in turn controls transistor 94 that is switched from non-conducting condition to conducting condition when rectifier 48 is turned on. Terminal 96 is connected to a gated voltage source which allows the rectifier 48 to be reset upon completion of the readout operation.

The shift register 20 includes a unijunction transistor 100 having connected to its control electrode 102 a capacitor 104 and a resistor 106 which is connected to control terminal 108. The output electrode of the unijunction transistor is connected through resistor 110 to a control transistor 112 which is connected to a B+ bus 114 through resistor 116. Also connected to the output electrode of transistor 112 is an auxiliary bus 118. Connected between bus 118 and ground is a Zener control diode 120 and a resistor 122; and a series of controlled rectifier switches 130A–N. Each controlled rectifier switch 130 has a control electrode 132, cathode channel 134 connected to ground, an anode channel 136 connected to auxiliary bus 118, and an output electrode 138 connected to a coupling circuit that includes capacitor 140 and resistors 142 and 144. Connected to the junction between resistor 142 and capacitor 140 of each stage except the first stage (switch 130A) is an output line 16 for sampling the corresponding storage circuit 10. Thus the output of switch 130B is applied to storage circuit 10A, the output of switch 130C is applied to storage circuit 10B, etc.

Each stage of the ring counter is similar and triggered by the pulse generated by the unijunction transistor. This circuitry may be connected to operate repetitively (as illustrated) (recycle automatically) or each cycle may require separate initiation. It will be noted that the first switch 130A does not have an output line connected to it. It is preferred to omit this output line for synchronizing purposes as the triggering of that switch in response to breakdown of Zener diode 120 is not synchronized in the same manner as is the application of transition pulses to subsequent switch stages of the ring circuit.

In the operation of this shift register ring a control level is applied to terminal 108 and that level, as a function of the values of the input circuit components 104, 106 causes the unijunction transistor 100 to produce a series of output pulses, the pulses being produced at a rate of about sixty per second with the component values shown in FIG. 2. Each output pulse triggers transistor 112 to connect auxiliary bus 118 to ground for a brief period (in the order of ten microseconds).

Initially, in response to application of power to the circuit (via bus 114) the Zener diode 120 breaks down (because no switch 130 is conducting) and a voltage transition is applied to input control electrode 132 to turn switch 130A on. The forward conducting impedance of the switch 130 in the order of 0.7 volt while the forward conducting impedance of transistor 112 in the order of 0.3 volt. Thus, when transistor 112 is turned on, in response to the next pulse from transistor 100, a brief voltage transition is applied to auxiliary bus 118 which releases the conductive switch 130A (places it in non-conducting condition), resulting in a transition which is applied through capacitor 140 to turn the next switch 130B on. The turn-on of switch 130B generates a sampling signal in the form of a voltage transition which is applied over line 16 to the input of storage circuit 10 to momentarily turn on transistor 86, which, in turn, turns off transistor 80, disconnecting the anode 64 of controlled rectifier 60 from the voltage source (connected at terminal 84) in a release or resetting operation should that rectifier 60 have been in conducting condition. (The ring control signal on terminal 108 typically is removed in response to an output signal on line 114 or a feed-back signal from the printer or other connected output equipment to stop the stepping of the ring circuit during performance of operations in response to such an output signal). The signal on line 16 produces a sampling interruption (a typical duration being in the order of 1 millisecond) of the connection of the voltage source 84 to the anode 64.

In response to the next output pulse from transistor 100, transistor 112 conducts briefly, dropping the voltage on bus 118 to about 0.3 volt and releasing the conducting switch 130B. (The duration of the output pulse from transistor 100 is in the order of 10 microseconds). When switch 130 is non-conductive, a voltage transition is applied to capacitor 140 via resistor 142 from main bus 114 and that voltage transition is coupled by capacitor 140 to turn on switch 130C (not shown). With the turn-on of switch 130C and the turn-off of transistor 112, bus 118 returns to the 0.7 voltage level.

Release of the last switch 130N of the ring circuit allows bus 118 to rise rapidly towards the source potential as applied through resistor 116. However, a Zener diode 120 breaks down in the manner above described and again applies a pulse to switch 130A to commence recycling of the ring circuit.

It will be seen that each rectifier 60 is placed in conducting condition by an input signal applied over line 12 through the input network including capacitor 70. This input signal is of a duration of substantially longer than the duration of the sampling interruption produced by transistor 80, a typical duration of that sampling interruption being one milllisecond while a typical duration of the input pulse applied to control electrode 66 being six milliseconds. If controlled rectifier 60 is conducting at the time the sampling pulse is applied (the signal applied to control electrode 66 having terminated) anode 64 is at ground potential, isolating the charging path for capacitor 40 (via diode 42) so that capacitor 40 has discharged through resistor 44 to a significant extent. When the B+ potential is reapplied through diode 42 to capacitor 40, rectifier 60 remains non-conductive and the transition will be coupled via resistor 50 to turn on control element 48 which via transistor 94 produces an output level on line 114.

This circuit arrangement assures that readout of input information will occur whenever input information is applied to the storage circuit and such input information will be readout only once even though the application of input pulses on line 12 is not synchronized in any respect with the application of sampling pulses on line 16. For example, should a sampling pulse 150 and an input pulse 152 be initiated simultaneously as indicated in stylized form in FIG. 3A, on termination of the sampling pulse the controlled rectifier 60 is immediately turned on again so that no transition is applied via diode 42 to capacitor 40. Rectifier 60 remains conducting after termination of the input pulse 152 and when the next sampling pulse 150 is applied, a readout transition will be produced by storage element 40, as rectifier 60 does not return to conductive condition after being released. Should sampling pulse 150 occur substantially at the termination of the input pulse 152 as indicated in FIG. 3B so that controlled rectifier 60 remains in nonconducting condition after termination of sampling pulse 150, capacitor 40 has been sufficiently discharged through the discharge circuit including resistor 44 so that a voltage transition in the order of 0.5–0.6 volt is applied to the control electrode 46 of the controlled rectifier 48. Further it should be noted that the duration of the sampling pulse 150 is of selected short duration so that the capacitor 40 cannot discharge sufficiently to produce an actuating pulse of magnitude sufficient to turn on the controlled rectifier 48 in response to the sampling pulse alone. For example, in the embodiment illustrated in FIG. 2 a sampling pulse duration of one millisecond produces a 0.2 volt transition at the control electrode 46, which transition is insufficient to switch rectifier 48 into conducting condition.

It will be seen that through proper coordination of the coupled circuitry the ring 20 can be free running with its outputs timed to sample all the storage circuits more frequently than serial repetition rate of application of signals to the input lines of those storage circuits. Those input signals may be applied at random or in parallel so that the circuitry functions as a parallel to series converter. In the particular embodiment shown in FIG. 1 there is further provided a control interlock responsive to the output circuitry. In that arrangement, when readout of a storage circuit is produced, the printer responds to the signal from the buffer logic 22 to produce a disabling output over line 28 which is fed back to the shift register to remove the ring control level applied at 108 during the printout operation. Termination of this control level allows the ring to resume stepping and is also applied to briefly interrupt the application of the B+ signal at terminal 96 to reset the output control rectifier 48 and remove the signal from the output line 114 (FIG. 2).

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A data storage circuit comprising a controlled rectifier having a main circuit and a control electrode, input circuitry coupled to said control electrode for applying a data storage signal to said control electrode to place said main circuit in conducting condition, said input circuitry including a pulse shaping network having a coupling capacitor connected in series with said control electrode for generating a pulse of predetermined effective time duration for application to said control electrode in response to said input data storage signal, a sampling circuit coupled to said main circuit for applying a sampling signal of substantially shorter duration than said data storage signal to said main circuit to release said main circuit from conducting condition in a data readout operation and an output circuit coupled to said main circuit, said output circuit including a capacitive storage element having an input terminal and an output terminal, a charging circuit including an asymmetrically conductive device connected between said main circuit and said capacitive storage element and a discharging circuit including an electric ciruit component that cooperates with said capacitive storage element to control the rate of discharge of said capacitive storage element, said output circuit producing a voltage transition if said main circuit of said controlled rectifier remains released from conducting condition after termination of said sampling signal.

2. A data storage circuit comprising a controlled rectifier having a main circuit and a control electrode, input circuitry coupled to said control electrode for applying a data storage signal to said control electrode to place said main circuit in conducting condition, an output circuit coupled to said main circuit, said output circuit including a capacitive storage element having an input terminal and an output terminal, a charging circuit including an asymmetrically conductive device and a discharging circuit including an electric circuit component that cooperates with said storage element to control the rate of discharge of said storage element connected to said storage element input terminal, said capacitive storage element producing a voltage transition at its output terminal if said main circuit of said controlled rectifier remains released from conducting condition after termination of said sampling signal, a sampling circuit coupled to said main circuit for applying a sampling signal of substantially shorter duration than said data storage signal to said main circuit to release said main circuit from conducting condition in a data readout operation and an output signal generating circuit coupled to said output terminal of said capacitive element including a second controlled rectifier having a main circuit and a control electrode and input circuitry coupled to said control electrode and responsive to said voltage transition to place said main circuit of said second controlled rectifier in conducting condition.

3. The circuit as claimed in claim 1 wherein said sampling circuit includes terminal means for applying a source of electric potential to said main circuit of said controlled rectifier and a gating device interposed between said terminal means and said main circuit for effectively disconnecting said main circuit from said terminal means in response to said sampling signal.

4. The data storage circuit as claimed in claim 3 wherein said input circuitry includes a pulse shaping network including a coupling capacitor connected in series with said control electrode for generating a pulse of predetermined effective time duration for application to said control electrode in response to an input data storage signal.

5. A data storage circuit comprising a controlled rectifier having a main circuit and a control electrode, input circuitry coupled to said control electrode for applying a data storage signal to said control electrode to place said main circuit in conducting condition, said input circuitry including a pulse shaping network having a coupling capacitor for generating a pulse of predetermined effective time duration for application to said control electrode in response to said input data sotrage signal, an output circuit coupled to said main circuit, said output circuit including a capacitive storage element having an input terminal and an output terminal, a charging circuit including an asymmetrically conductive device and a discharging circuit including an electric circuit component that cooperates with said storage element to control the rate of discharge of said storage element connected to said storage element input terminal, said capacitive storage element producing a voltage transition at its output terminal if said main circuit of said controlled rectifier remains released from conducting condition after termination of said sampling signal, a sampling circuit coupled to said main circuit for applying a sampling signal of substantially shorter duration than said data storage signal to said main circuit to release said main circuit from conducting condition in a data readout operation, said sampling circuit including terminal means for applying a source of electric potential to said main circuit of said controlled rectifier and a gating device interposed between sad terminal means and said main circuit for effectively disconnecting said main circuit from said terminal means in response to said sampling signal and an output signal generating circuit coupled to said output terminal of said capacitive element including a second controlled rectifier having a main circuit and a control electrode and input circuitry coupled to said control electrode and responsive to said voltage transition to place said main circuit of said second controlled rectifier in conducting condition.

6. A signal translation system comprising a series of data storage circuits, each said data storage circuit including a controlled rectifier having a control electrode and a main circuit, an input circuit coupled to said control electrode for applying to said control electrode an information signal of predetermined time duration to place said main circuit in conducting condition, an output circuit including a capacitor for applying a signal to output equipment upon release of a conducting condition of the main circuit of said controlled rectifier, and a sampling circuit coupled to said storage circuits for sequentially sampling said storage circuits by application of sampling signals of substantially shorter time duration than said input information signal effective to release the main circuit of the sampled storage circuit from conducting condition and produce an output signal and place the sampled storage circuit in condition for receiving further data, said sampling circuit including a series of similar stages, each said stage corresponding to a data storage circuit and including a solid state switch having a control electrode, a main circuit and an output electrode, circuitry including a capacitor coupling the output electrode of each said switch to the control electrode of the next switch in said sampling circuit, circuitry coupling the output electrode of each switch to the main circuit of the corresponding controlled rectifier, and circuitry for applying a control signal to a conductive switch for releasing the main circuit of that conducting switch and simultaneously producing said short time duration sampling signal for application to the corresponding storage circuit and applying a turn on signal to the coupled control electrode of the next device in said sampling circuit to place its main circuit in conducting condition.

7. A signal translation system comprising a plurality of data storage circuits, each said storage circuit including a controlled rectifier having a control electrode and a main circuit, input circuitry coupled to said control electrode for applying to said control electrode an information signal of predetermined time duration to place said main circuit in conducting condition, and an output circuit coupled to said main circuit, the input circuitry of each said data storage circuit including a pulse shaping network including a coupling capacitor for generating a pulse of predetermined effective time duration for application to said control electrode in response to an input data storage signal and the output circuit of each said data storage circuit including a capacitive storage element having an input terminal and an output terminal, a charging circuit including an asymmetrically conductive device and a discharging circuit including an electric circuit component that cooperates with said storage element to control the rate of discharge of said storage element connected to said storage element input terminal, said capacitive storage element producing a voltage transition at its output terminal if said main circuit of said controlled rectifier remains released from conducting condition after termination of said sampling signal and a sampling circuit coupled to said storage circuits for sequentially sampling said storage circuits by the application of a sampling signal to a storage circuit of substantially shorter time duration than said input signal effective to release the main circuit of the sampled storage circuit from conducting condition such that said storage circuit produces an output signal and the interrogated storage circuit is placed in condition for receiving further data, said sampling circuit being in the form of a sequencing circuit including a series of similar stages, each said stage including a solid state device having a control electrode and an output electrode, and circuitry for applying input signals to said sequencing circuit to produce a series of output sampling signals, said circuitry adapted to respond to an output signal from a storage circuit for inhibiting the stepping of said sequencing circuit.

8. The signal translation system as claimed in claim 7 wherein each said data storage circuit further includes an output signal generating circuit coupled to said output terminal of said capacitive element including a second controlled rectifier having a main circuit and a control electrode and input circuitry coupled to said control electrode and responsive to said voltage transition to place said main circuit of said second controlled rectifier in conducting condition.

9. The signal translation system as claimed in claim 8 wherein each said data storage circuit further includes terminal means for applying a source of electric potential to said main circuit of said controlled rectifier and a gating device interpassed between said terminal means and said main circuit for effectively disconnecting said main circuit from said terminal means in response to said sampling signal.

10. A signal translation system comprising a data storage circuit, said data storage circuit including a controlled rectifier having a control electrode and a main circuit, an input circuit coupled to said control electrode for applying to said control electrode an information signal of predetermined time duration to place said main circuit in conducting condition, an output circuit connected to said main circuit and includnig a capacitor for applying a signal to output equipment upon release of a conducting condition of the main circuit of said controlled rectifier, and a sampling circuit coupled to said data storage circuit for sampling said data storage circuit by application of a sampling signal of substantially shorter time duration than said input information signal effective to release the main circuit of the sampled storage circuit from conducting condition and produce an output signal, said sampling circuit including a solid state switch having a control electrode, a main circuit and an output electrode, circuitry coupling the output electrode of said switch to the main circuit of said controlled rectifier and circuitry for applying a control signal for releasing the main circuit of the switch from conducting condition to produce said short time duration sampling signal for application to said data storage circuit to release its main circuit and produce an output signal and to place said data storage circuit in condition for receiving further data.

References Cited

UNITED STATES PATENTS

| | | | |
|---|---|---|---|
| 3,132,264 | 5/1964 | Dahme | 340—173 X |
| 3,202,919 | 8/1965 | Kitz et al. | 328—67 |
| 3,217,176 | 11/1965 | Chin | 307—252 X |
| 3,243,728 | 3/1966 | Brainerd et al. | 307—242 |
| 3,231,758 | 1/1966 | Diamant | 307—252 X |
| 3,358,237 | 12/1967 | Houle | 328—104 |

STANLEY M. URYNOWICZ, Jr., Primary Examiner

JOSEPH F. BREIMAYER, Assistant Examiner

U.S. Cl. X.R.

307—238, 242, 246, 252